United States Patent [19]

Davis et al.

[11] Patent Number: 4,963,301
[45] Date of Patent: Oct. 16, 1990

[54] METHOD FOR FABRICATION OF REFRACTORY COMPOSITE TUBING

[75] Inventors: H. O. Davis, Alameda; James M. Barrier, Anaheim Hills, both of Calif.

[73] Assignee: Kaiser Aerotech, San Leandro, Calif.

[21] Appl. No.: 212,627

[22] Filed: Jun. 28, 1988

[51] Int. Cl.⁵ .................... C01B 31/00; C04B 35/64
[52] U.S. Cl. ............................ 264/29.7; 264/62; 264/258
[58] Field of Search .............. 264/258, 62, 29.7; 501/88

[56] References Cited

U.S. PATENT DOCUMENTS

| | | | |
|---|---|---|---|
| 3,093,532 | 6/1963 | Miller et al. | 264/258 |
| 4,741,873 | 5/1988 | Fischer | 264/258 |
| 4,837,230 | 6/1989 | Chen et al. | 501/88 |
| 4,853,172 | 8/1989 | Jacaruso et al. | |

OTHER PUBLICATIONS

Brochure from Century Design, Inc., "Composite Machinery & Equipment" with 2 inserts (1) M-800B Rolling Table and (2) M-880FP Rolling Table.

Primary Examiner—James Derrington
Attorney, Agent, or Firm—Townsend and Townsend

[57] ABSTRACT

Reinforced composite tubes are formed by rolling a flat reinforcement fabric onto a cylindrical or conical mandrel under tension. By pre-impregnating the fabric with a suitable matrix precursor or by serving the individual threads of the fabric with a thermoplastic, the fabric may be compressed by applying heat and pressure during the rolling process. After rolling, the resulting prepreg is cured in a suitable vacuum bag, also under heat and pressure. The cured prepreg may then be converted by pyrolysis and densified by repeated impregnation and converting steps. The resulting composite tubes are substantially free from mechanical defects which would reduce their strength.

15 Claims, 2 Drawing Sheets

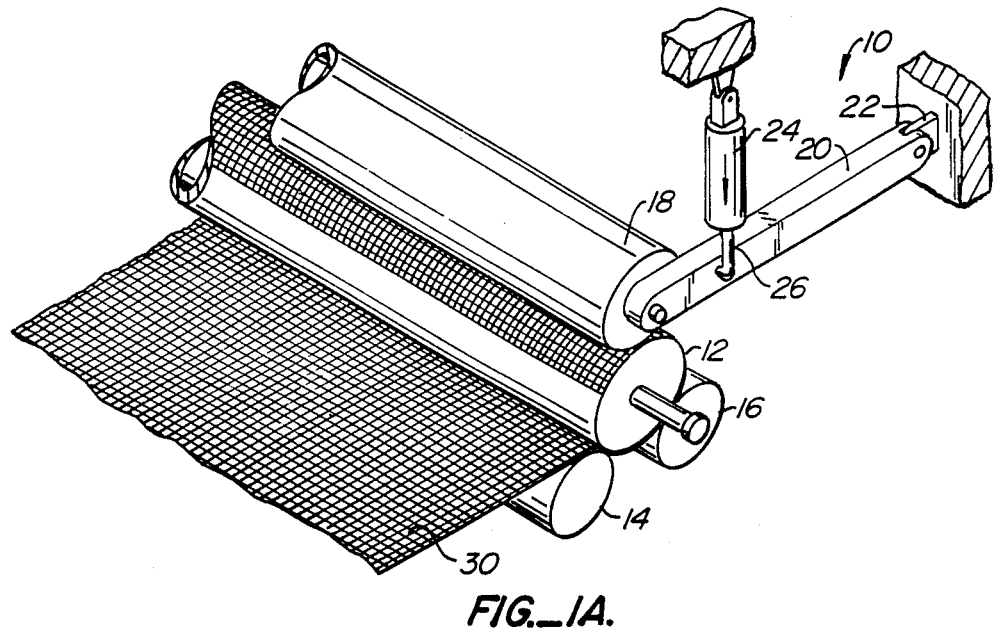
FIG._1A.
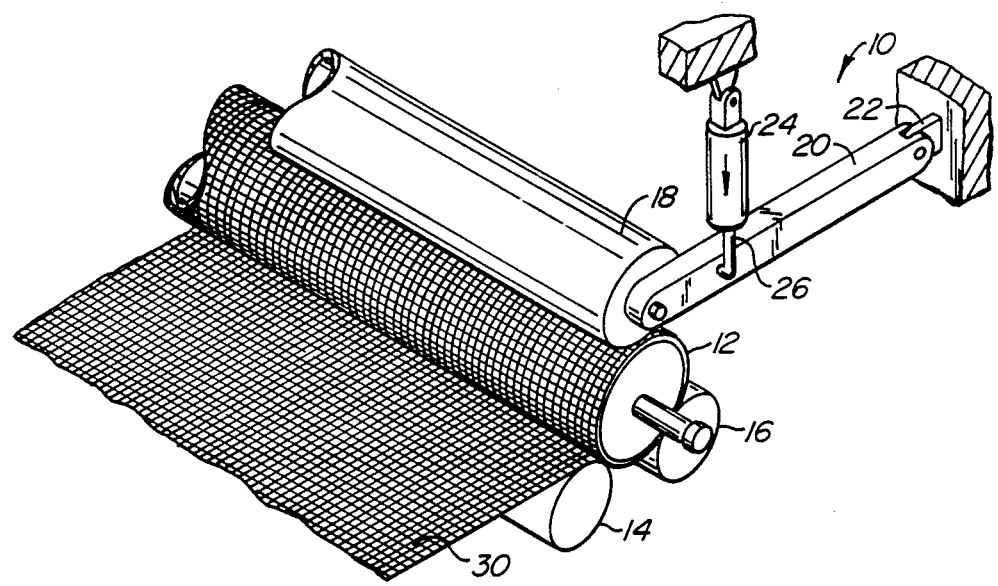
FIG._1B.

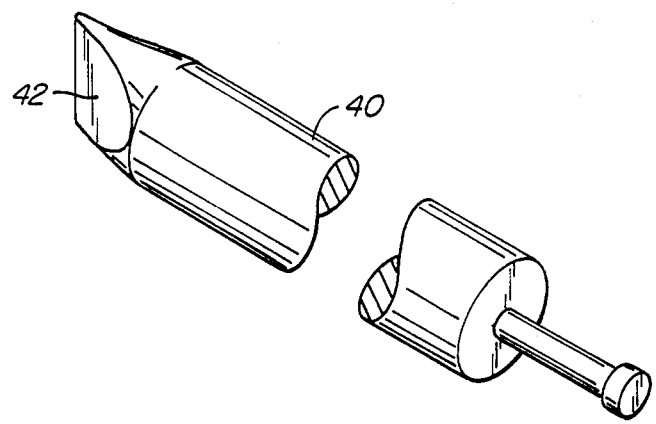
FIG._2.
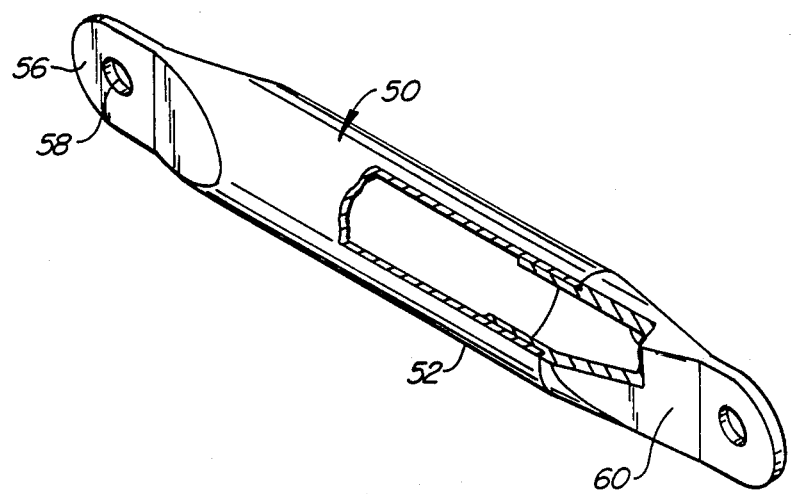
FIG._3.

METHOD FOR FABRICATION OF REFRACTORY COMPOSITE TUBING

BACKGROUND OF THE INVENTION

1. Field of the Invention

The present invention relates generally to methods for the fabrication of composite materials. More particularly, the present invention relates to a method for forming reinforced refractory composite tubing having very high fiber volume and very low porosity.

Reinforced composite tubing is useful for a number of purposes, such as the construction of structural frameworks. Desirably, such structural tubing will possess high tensile and compression strength, even at high and low temperature extremes as well as high specific strength and modulus.

Heretofore, refractory composite tubing, e.g., ceramic and graphite matrix tubing, has usually been made from braided reinforcement fabrics or by using an involute lay-up process. Although suitable for many purposes, braided composite tubing generally has a reduced fiber volume in the primary load direction which can reduce its usefulness. The refractory composite tubing made by involute rolling techniques generally possesses higher strength (improved fiber orientation can be achieved), but is relatively difficult to fabricate. In one such technique, a series of narrow strips of reinforcement fabric are layered over one another in an overlapping fashion. Pressure may be applied to the layers during curing, and intermediate bleeder cloths are frequently necessary to allow the escape of entrapped air. Refractory composite tubing prepared by such an involute technique is subject to separation of the layers when exposed to extreme temperature variations. Both braided and involute tubing suffer from substantial dimensional deviations so that product having reproducible dimension is difficult to achieve.

It would therefore be desirable to provide methods for fabricating reinforced refractory composite tubing having high fiber volume and low porosity which allow for selectable strength characteristics with optimized fiber volume and fiber orientation. Such methods should also provide tubing which is substantially free from wrinkling and other mechanical defects and which possesses highly accurate and reproducible dimensions and does not necessarily require the use of bleeder cloth during fabrication. The resulting tubing should be able to withstand severe temperature variations and temperature cycling without unbonding of the reinforcement layers or filaments from the matrix.

2. Description of the Background Art

Composite flexible tubing suitable for fishing rods and other light duty uses have been made from non-refractory fabric prepregs using rolling plate and shear-type wrappers available from commercial suppliers, such as Century Designs, Inc., San Diego, California. Three-bar wrappers of the type which may be employed in the present invention have been used to produce non-refractory composites (e.g., glass fiber reinforced plastics) for uses such as boat masts and pole vault poles. Vacuum bag curing of non-refractory composite articles is known.

SUMMARY OF THE INVENTION

The present invention comprises a method for forming reinforced refractory composite tubes which are particularly useful as structural elements in construction. Tubing produced by the method of the present invention is substantially free from mechanical defects, such as wrinkles, folds, fiber distortions, undulations, and the like, which have been characteristic of previous refractory composite tubing. Such defects are undesirable as they can serve as initiation sites for structural failure, particularly for separation between reinforcement fabric layers and for fiber to matrix debonding.

The process of the present invention comprises rolling a continuous sheet of reinforcement fabric onto a mandrel, typically a cylindrical mandrel. The reinforcement fabric is pre-impregnated with a suitable matrix precursor and/or served with a suitable thermoplastic, and the rolling is performed under heat and pressure with tension on the fabric so that the layered plies are substantially free from mechanical defects. In addition to reducing the incidence of defects, such rolling of the fabric increases the fiber density of the final composite, typically by a factor of at least about 1.4, usually being at least about 1.7, and frequently being 1.9 or greater. The composite is then cured or melted in a vacuum bag which is subjected to external pressure at an elevated temperature. The use of a vacuum bag facilitates the application of external pressure and inhibits foaming of the matrix precursor resulting from the release of reaction products as the matrix is cured. The cured or bonded fabric layers may then be pyrolyzed and/or densified depending on the nature of the matrix. Typically, multiple stage densification is employed where the impregnant is introduced as a liquid or gas and converted to the final matrix form in at least two stages, typically in at least four stages, and sometimes in as many as ten stages, until a final desired density is achieved.

In the preferred embodiment, the method of the present invention employs a mandrel having a coefficient of expansion greater than that of the composite tube. Such a mandrel will thus enjoy a differential rate of expansion resulting in an outward pressure on the tubing wall during curing and pyrolysis. In particular, the pressure enhances the matrix compaction which occurs during curing and produces an improved microstructure, resulting in a higher strength product with fewer mechanical defects. In a particularly preferred embodiment, different mandrel materials will be used during curing and pyrolysis, where the material used during curing has a higher coefficient of expansion but lower temperature tolerance.

The reinforced composite tubes may be modified to facilitate their interconnection. In particular, the ends of the tubes may be tapered or thickened define flat or clevis surfaces which may be connected to each other or to other structural members. The tapered ends are formed during fabrication by employing a mandrel having one end shaped in the desired taper. The fabric is then rolled as described above, and the taper formed during the vacuum curing step. After curing, the taper is trimmed to the desired final dimensions, and the tube densified. Optionally, metal or other reinforcement may be introduced to the tapered end and/or the tube ends may be rounded or shaped and joined by interconnection pins or by bonding.

BRIEF DESCRIPTION OF THE DRAWINGS

FIGS. 1A and 1B illustrate a preferred method for rolling the reinforcement fabric onto a cylindrical mandrel under tension according to the method of the present invention.

FIG. 2 illustrates a tapered mandrel useful for forming composite tubes having tapered ends, according to the method of the present invention.

FIG. 3 illustrates a composite tube having tapered ends formed according to the method of the present invention.

DESCRIPTION SPECIFIC EMBODIMENTS

The reinforced composite tubes of the present invention are formed from relatively flexible reinforcement fabrics prepared by conventional two-dimensional weaving techniques, such as plain, basket, or harness weaving techniques. The fabrics are formed in continuous sheets having a width sufficient to extend the entire length of the tube which is to be formed. The length will be sufficient to provide the desired number of plies as the fabric is rolled, as described hereinafter. In some cases, it may be necessary or desirable to employ two or more separate sheets but usually only one continuous sheet will be employed. The sheets will generally comprise a single ply of material, but may in certain cases employ two or more plies formed into a single fabric sheet.

The fabric sheets are formed from woven reinforcement strands, including both individual fibers and bundles of fibers (yarns), where the dimensions and tensile strength of the reinforcement strands will vary depending on the desired strength of the tube and the nature of the material employed. Typically, monofilaments will have a diameter in the range from about 1 to 150 $\mu$m, usually in the range from about 5 to 10 $\mu$m, while yarns will be comprised of a plurality of individual monofilaments, typically including from about 100 to 20,000 monofilaments, usually comprising from at least about 3,000 to 6,000 monofilaments, where each monofilament has a diameter in the range from about 1 to 20 $\mu$m. The denier of both the monofilaments and the yarns used in the reinforcement fabric will typically be in the range from about 500 to 5,000 mg/m, usually being in the range from about 1,000 to 2,000 mg/m.

Suitable reinforcement materials will usually be composed of inorganic filaments, including ceramics, carbon and graphite, glass, and aramid materials. Suitable ceramic materials include silicon carbide, alumina, silicon nitride, boron/tungsten, boron carbide, boron nitride, and zirconia filaments and yarns available from commercial suppliers such as Dow-Corning, Midland, Michigan; AVCO Specialty Materials Division, Lowell, Massachusetts; and the 3M Company, Minneapolis, Minnesota. Carbon and graphite filaments and yarns are available from Hercules, Inc., Wilmington, Delaware; Celanese Engineering, Chatham, New Jersey; Union Carbide Corporation, Specialty Polymers and Composites Division, Danbury, Connecticut; and Hitco, Gardena, California. Suitable glass filaments and yarns include fused silica, "C" glass, "D" glass, "E" glass, "M" glass, "S" glass, X2285, X2124, VARL 344, VARL 417, and PRD-49, available from a wide variety of commercial suppliers, including DuPont, Wilmington, Delaware; Owens-Corning Fiberglass Corp., Toledo, Ohio; and PPG Industries, Pittsburg, Pennsylvania. Aramid filaments and yarns are available commercially from suppliers such as DuPont de Nemours, Wilmington, Delaware, under the trade name Kevlar are also suitable.

The reinforcement fabrics will usually be composed of a single-type of reinforcement material, although in some cases it may be desirable to employ two or more different materials. Similarly, individual yarns in the reinforcement fabric may be composed of two or more filament materials when it is desired to combine the characteristics of the various materials.

Optionally, the individual reinforcement strands of the reinforced fabric may be served with a thermoplastic thread, which may itself be a monofilament or multifilament bundle (yarn), as described in U.S. Pat. No. 4,741,873. The thermoplastic serving will melt under the heat and pressure during the rolling operation described hereinafter, solidify to produce interyarn and interply bonding, forming a rigid structure which will retain the desired geometry during subsequent densification operations, such as chemical vapor deposition with carbon, silicon carbide, silicon nitride, and the like.

The reinforced composite tubes of the present invention will be formed with conventional liquid matrix precursors to form carbon and ceramic matrices. Carbon or graphite matrices will be formed using suitable liquid organic precursors, including phenolic resins, epoxies, polyesters, polyamides, polyimides, furfuraldehydes, liquid pitch, and most other thermoplastic and thermosetting resins. Suitable ceramic precursors include silicones and organo-metallic precursors, including polycarbosilanes and liquid aluminum oxide (alumina) precursors. These materials may serve as a preimpregnant as well as the impregnant used for densification as described hereinafter.

After weaving the reinforcement fabric in a conventional manner, liquid matrix precursor will usually be applied to the fabric, typically by spraying, dipping, or spreading, and optionally, the precursor may be partially cured prior to rolling the fabric on a mandrel. Fabric formed from served reinforcement strands will usually not require such pre-impregnation.

The served and/or pre-impregnated reinforcement fabric is rolled over a mandrel having a desired geometry, typically cylindrical or conical, under a preselected tension, typically from about 1 to 10 pounds per inch width. As the fabric is being rolled on the mandrel, heat and pressure will be applied at one or more locations, typically using opposed rollers and bars which are forced against the mandrel as the fabric is being rolled. Conveniently, one or more of the rollers or bars may be internally heated, although it would also be possible to perform the rolling process in a heated environment, such as an oven.

A particularly convenient system for rolling the reinforcement fabric onto cylindrical and conical mandrels is shown in FIGS. 1A and 1B. As illustrated, the system 10 includes a cylindrical mandrel 12 which is supported on a pair of lower cylindrical bars 14 and 16. The bars 14 and 16, in turn, are slidably supported on a table (not illustrated) at each end so that the spacing between the bars may be adjusted. A roller 18 is disposed over the mandrel 12 and mounted on a lever arms 20 (only one of which is illustrated) which are pivotally mounted on fixed connectors 22. A downward force is applied on the roller 18 by a piston and cylinder assemblies 24 which are fixed at their upper ends and attached to the lever arms 20 by a piston rod 26. The bars 14 and 16 and roller 18 are axially aligned (for cylindrical mandrels), and the mandrel 12 is rotatably mounted therebetween. By tapering the spacing between the opposed bars 14 and 16, tapered or conical mandrels can be accomodated by this system.

Fabric 30 is rolled onto mandrel 12 by first attaching the fabric to the mandrel. The mandrel 12 is then rotated, usually at from 1 to 10 rpm, to apply a constant pull force on the fabric. A downward force, typically in the range from about 5 to 200 pounds per inch width, is simultaneously applied on the roller 18 by the piston and cylinder assemblies 24. Additionally, one or both of the support bars 14 and 16 will be heated, typically to a temperature of bout 250° F. by internal steam or electrical resistance heating elements, so that heat is applied directly to the reinforcement fabric as it is rolled onto the mandrel 12. Preferably, at least the first bar 14 will be heated so that the serving and/or pre-impregnant will be melted prior to reaching the first contact point with the roller 18. The mandrel 12 is rolled through a sufficient number of revolutions to apply the desired number of plies of reinforcement fabric over the mandrel, typically from about 2 to 50 plies, usually being from about 2 to 10 plies, more usually being about 4 plies. The heat and pressure serve to meld the serving and/or pre-impregnant together while compressing the successively applied plies to increase the fiber density of the resulting preform. It is the rolling operation, performed prior to curing of the preform, which provides the initial filament orientation and density for the improved product of the present invention. The simultaneous stretching and compressing actions provide such high fiber density without causing wrinkles and other mechanical defects which would be the result if the fiber density were increased by pressure alone during the curing operation.

Curing according to the present invention is performed in a resilient jacket which is sealed around the preform while still mounted on the mandrel. The jacket is evacuated, and the resulting vacuum causes the jacket wall to compress inward against the preform. Additionally, the vacuum serves to draw off the reaction products which are evolved during the curing operation, frequently eliminating the need to provide bleeder cloths to facilitate removal of volatile reaction products which might otherwise become entrapped in the matrix. For tubes having a wall thickness greater than about 0.10 inch, however, use of a bleeder cloth will generally be desirable.

Conveniently, the jacket may be formed from a thermosetting elastomer, such as silicone rubber, by fitting the jacket material about the mandrel (in the absence of reinforcement material) and curing the jacket by exposure to an elevated temperature (usually at about 400° F. for four hours to drive out remaining volatiles. In this way, the jacket tightly conforms to the geometry of the mandrel which corresponds to the desired geometry of the finished part. Suitable silicone rubbers include General Electric 875 and Dow Corning HGS 80.

Curing of the formed reinforcement fabric will be carried out at an elevated temperature, typically in the range from about 700 to 800° F., depending on the nature of the pre-impregnant. Usually, the curing will be carried out under an elevated pressure, typically in the range from about 15 to 300 psig, more typically in the range from about 75 to 100 psig. Conveniently, the curing may be carried out by placing the vacuum bag in an autoclave which allows control of the temperature and external pressure on the vacuum bag while the vacuum bag remains connected to a separate vacuum source. Alternatively, curing may be accomplished by internally heating the mandrel while external pressure is applied in a suitable pressure vessel. Curing will normally be performed for a period of from about 5 minutes to 3 hours, more usually from about 1 to 2 hours.

Specific methods for curing polycarbosilane impregnants and liquid aluminum oxide precursor impregnants are set forth in U.S. Pat. application Ser. No. 046,956 and U.S. Pat. application Ser. No. 166,958, the disclosures of which are incorporated herein by reference.

Once the tube preforms have been cured, it is necessary to convert the cured matrix precursor into the final matrix material, typically by pyrolysis at an elevated temperature in the range from about 400 to 1500° F. Particular methods for curing the polycarbosilane precursors and the aluminum oxide precursors are set forth in the above-referenced patent applications. Liquid organic precursors may be converted to carbon by pyrolysis at temperatures in the range from about 500 to 1500.F, typically for periods of from about 1 to 24 hours.

The mandrel will preferably be formed from a material having a greater coefficient of expansion than the matrix being produced, typically being in the range from about 1.1 to 10 times greater. The differential expansion of the mandrel and the tube undergoing curing or conversion has been found to induce hoop loading in the tubing which improves the bonding between the matrix and the reinforcement fibers. The resulting tubes have greater resistance to both micro and macro buckling. The mandrel material selected, of course, will have to withstand the process conditions, and it may be desirable to employ higher expansion coefficient materials for curing (low temperature) than pyrolysis (high temperature).

Materials suitable for construction of mandrels useful in curing and pyrolysis include the following.

| Process | Material | Coefficient of Thermal Expansion (in/in/°F.) |
|---|---|---|
| Curing | Aluminum | $12.5 \times 10^{-6}$ |
| " | Steel (1020) | $6.5 \times 10^{-6}$ |
| " | Steel (1040) | $6.3 \times 10^{-6}$ |
| " | Steel (1080) | $6.0 \times 10^{-6}$ |
| Pyrolysis | $Al_2O_3$ | $5.0 \times 10^{-6}$ |
| " | SiC | $2.5 \times 10^{-6}$ |
| " | Graphite (Bulk) | $3.0 \times 10^{-6}$ |

As conversion of the matrix precursors normally results in a reduction of matrix volume, it will be necessary to apply additional liquid matrix precursor material to the partially densified product. The liquid precursor material may be the same or different from the precursor (if any) which was used as the pre-impregnant. The additional liquid precursor material will be applied by spraying, dipping, or spreading in a conventional manner, and will be converted to the desired matrix material generally by polymerization as described above. A total of from two to ten densification steps may be performed, providing a final composite tube having a density in the range from about 1.2 to 2.7 g/cm$^2$.

The method for forming the composite tube as just described may be modified in order to provide for a tapered tube end which is useful in allowing for interconnection of the tubes. By employing a cylindrical mandrel 40 having a tapered end 42, as illustrated in FIG. 2, the reinforcement fabric may be rolled onto the mandrel so that it extends over the tapered portion thereof. When the rolled reinforcement fabric on the mandrel is placed in the vacuum bag for curing, the external pressure will force the rolled fabric to conform to the taper. By providing sufficient reinforcement material to extend beyond the tip of the taper 42, a flat portion may also be provided, as illustrated in FIG. 3. Usually, the vacuum bag will be formed so that the taper precisely assumes the desired shape. After curing, excess material may be trimmed to form a final product which appears as in FIG. 3. There, the tube 50 includes a cylindrical portion 52 and a tapered end 54 having a flat extension 56 extending therefrom. A hole 58 may be formed in the flat extension so that the end may be fastened using conventional fasteners, such as nuts and bolts. The tube 50 will usually include a second tapered end 60, but the second tapered end will normally not be formed during the same fabrication step as the cylindrical wall 52 and the first tapered end 54. The reason both tapered ends cannot be formed simultaneously is that the mandrel 40 must be removed from inside the composite tube 50, necessitating that the second end be left open. The second tapered end may be formed separately, either by the method of the present invention or by a separate method. The two parts may then be connected, either by suitable adhesives or by mechanical fasteners.

Although the foregoing invention has been described in some detail by way of illustration and example for purposes of clarity of understanding, it will be obvious that certain changes and modifications may be practiced within the scope of the appended claims.

What is claimed is:

1. A method for forming reinforced refractory composite tubes, said method comprising:
    (a) rolling a continuous reinforcement fabric onto a mandrel under tension while simultaneously applying heat and pressure, said fabric being pre-impregnated with a refractory matrix precursor or served with a thermoplastic so that successive plies of the fabric are compressed without the introduction of mechanical defects;
    (b) curing the refractory matrix precursor or thermoplastic serving on the rolled reinforcement fabric under a vacuum at an elevated temperature;
    (c) converting the cured refractory matrix precursor or thermoplastic on the rolled reinforcement fabric to the corresponding refractory matrix by pyrolysis while the rolled reinforcement fabric is present on a mandrel having a coefficient of thermal expansion from 1.1 to 10 times greater than that of the refractory matrix;
    (d) impregnating the rolled reinforcement fabric with additional matrix precursor;
    (e) converting the additional matrix precursor to matrix; and
    (f) repeating steps (d) and (e) until a desired matrix density is achieved.

2. A method as in claim 1, wherein step (b) is performed while the rolled reinforcement fabric is present on a first mandrel and step (c) is performed while the rolled reinforcement fabric is present on a second mandrel, wherein the first mandrel has a higher coefficient of thermal expansion than the second mandrel.

3. A method as in claim 1, further comprising tapering one end of the rolled reinforcement fabric prior to step (d), whereby the tapered end can serve as an attachment point on the reinforced composite tube.

4. A method as in claim 3, wherein the one end is tapered by forming over a tapered end of the mandrel.

5. A method as in claim- 3, further comprising trimming the tapered end to a desired profile.

6. A method as in claim 1, wherein the reinforcement fabric is composed of a material selected from the group consisting of graphite, ceramic, glass, and aramid.

7. A method as in claim 1, wherein fabric is impregnated with an organic matrix precursor material selected from the group consisting of liquid organic precursors, polycarbosilanes, and liquid aluminum oxide precursors.

8. A method as in claim 1, wherein the rolling is performed using opposed rollers and bars which are under a preselected compressive force.

9. A method as in claim 8 wherein the mandrel is cylindrical and supported on a pair of bars rollers with at least one opposed roller overhead, wherein at least one of the bars is heated.

10. A method as in claim 1, wherein the rolling step increases the density of the reinforcement fabric by a factor of at least about 1.4.

11. A method as in claim 1, wherein the rolled fabric has from about 2 to 50 plies.

12. A method as in claim- 1. wherein the matrix precursor is cured by placing the rolled fabric on the mandrel into a fitted vacuum bag, applying an elevated pressure to the exterior of the vacuum bag, and externally heating the bars.

13. A method as in claim 1, wherein the matrix precursor is cured by placing the rolled fabric into a fitted vacuum bag, applying an elevated pressure to the exterior of the vacuum bag, and internally heating the mandrel supporting the rolled fabric.

14. A method as in claim 1, wherein individual fibers of the reinforcement fabric are served with thermoplastic filaments and cured as set forth in step (b).

15. A method as in claim 1, wherein step (b) and step (c) are performed with the rolled reinforcement fabric present on the same mandrel.

* * * * *